United States Patent
Williams, Jr.

(10) Patent No.: US 6,896,283 B1
(45) Date of Patent: May 24, 2005

(54) AIRCRAFT TUG HITCH ASSEMBLY

(76) Inventor: Thomas M. Williams, Jr., 2310 Old Oxford Hwy., Durham, NC (US) 27704

( * ) Notice: Subject to any disclaimer, the term of this patent is extended or adjusted under 35 U.S.C. 154(b) by 1 day.

(21) Appl. No.: 10/624,323

(22) Filed: Jul. 22, 2003

Related U.S. Application Data (60) Provisional application No. 60/397,243, filed on Jul. 22, 2002.

(51) Int. Cl.[7] .................................................. B60D 1/00
(52) U.S. Cl. ...................................................... 280/515
(58) Field of Search ............................... 280/508, 515, 280/514, 477

(56) References Cited

U.S. PATENT DOCUMENTS

| | | | | |
|---|---|---|---|---|
| 2,478,736 A | * | 8/1949 | Balzen ........................ | 280/477 |
| 2,844,390 A | * | 7/1958 | Smith ......................... | 280/477 |
| 3,046,037 A | * | 7/1962 | Cain ........................... | 280/477 |
| 3,161,422 A | * | 12/1964 | Wade .......................... | 280/508 |
| 3,889,979 A | * | 6/1975 | Schmiesing .................. | 172/272 |
| 3,912,302 A | * | 10/1975 | Patterson .................... | 280/477 |
| 5,037,123 A | * | 8/1991 | Smith ......................... | 280/508 |
| 5,286,050 A | * | 2/1994 | Stallings et al. ............ | 280/477 |

* cited by examiner

Primary Examiner—Lesley D. Morris
Assistant Examiner—Paul Royal, Jr.
(74) Attorney, Agent, or Firm—Mills Law Firm PLLC (57) ABSTRACT

An aircraft tug hitch assembly includes deflectable guide plates providing a converging pocket for mechanically positioning a tow bar eyelet with the hitch lock pin. The hitch includes a lock assembly including a lock pin is mounted on a slidable piston for operator controlled movement between a detented raised unlocked position and a lower locked position capturing the tow bar eyelet. An indicator ball carried by the piston is observable by the tug operator when the lock assembly is in the unlocked position, but is not visible in the locked position thereby confirming hitch status without the need for verbal communication with ground personnel.

11 Claims, 7 Drawing Sheets

FIG. 8 though the drawings in which:

AIRCRAFT TUG HITCH ASSEMBLY

RELATED APPLICATION

This application claims the benefit under 35 USC 121 of U.S. Provisional Application No. 60/397,243 filed on Jul. 22, 2002 in the name of Thomas M. Williams, Jr. and entitled "Aircraft Tug Hitch Assembly".

FIELD OF THE INVENTION

The present invention relates to coupling systems for releasably attaching a tow bar to an aircraft tug for transferring an aircraft between field locations.

BACKGROUND OF THE INVENTION

Aircraft tractors or tugs are used in combination with a tow bar attached to the nose wheel of an aircraft for transporting the aircraft on the ground, such as ramp and taxi positions. The tug typically has a hitch at the rear having upper and lower apertured plates. The tow bar frontally terminates with an apertured tow eyelet. For connecting, the tug operator maneuvers the hitch into proximity with the tow bar, while the eyelet is aligned with the hitch by an assistant on the ground. Inasmuch as the tug structure prevents direct visual observation, the tug operator is reliant on the assistant for movement instructions. When properly aligned the assistant inserts a latch pin through the plates and the eyelet to complete the coupling. The operation requires accurate and timely communication between the parties to accomplish a time efficient and safe connection. These requirements are often compromised by operating conditions resulting in a large incidence of personnel injuries.

BRIEF SUMMARY OF THE INVENTION

The present invention provides hitch assembly for coupling an aircraft tow bar with an aircraft tug having a hitch at the rear including vertically spaced upper and lower plates having coaxially aligned apertures with which an apertured eyelet is aligned for coupling. The hitch assembly includes: a locking assembly fixedly connected to said upper plate having a sliding locking bolt that is moveable between a lowered locked position extending through said plates and the eyelet, and a raised unlocked position. A lift handle raises the locking bolt between the lower and raised position including a detent notch for releasably maintaining said unlocked position. A pair of spring biased laterally spaced inwardly converging guide plates carried between the hitch plate provides a receiving pocket for aligning the toy bar eyelet with the lock pin. The guide plates resiliently deflect to permit tight radius turns. A signal rod on the locking bolt caries an indicator ball at top. The ball is visible to the tug operator to indicate the unlocked position, but is not visible in the locked position to thereby indicate coupled locked status between the aircraft and the tug.

Accordingly, it is an object of the invention to provide a hitch assembly for coupling an aircraft tug with an aircraft tow bar wherein coupling can be readily and safely accomplished.

Another object is to provide an aircraft hitch wherein the aircraft tug operator can visually determine the status of the hitch coupling.

A further object is to provide an aircraft tug hitch assembly wherein deflectable guide surfaces properly orient a tow bar eyelet for coupling.

Yet another object is to provide a locking aircraft towing hitch that may be aligned and locked by a single operator with reduced interaction with the aircraft tug operator.

DESCRIPTION OF THE DRAWINGS

The above and other features of the present invention will become apparent upon reading the following written description taken in conjunction with the accompanying drawings in which.

DESCRIPTION OF THE INVENTION

Figure 1:
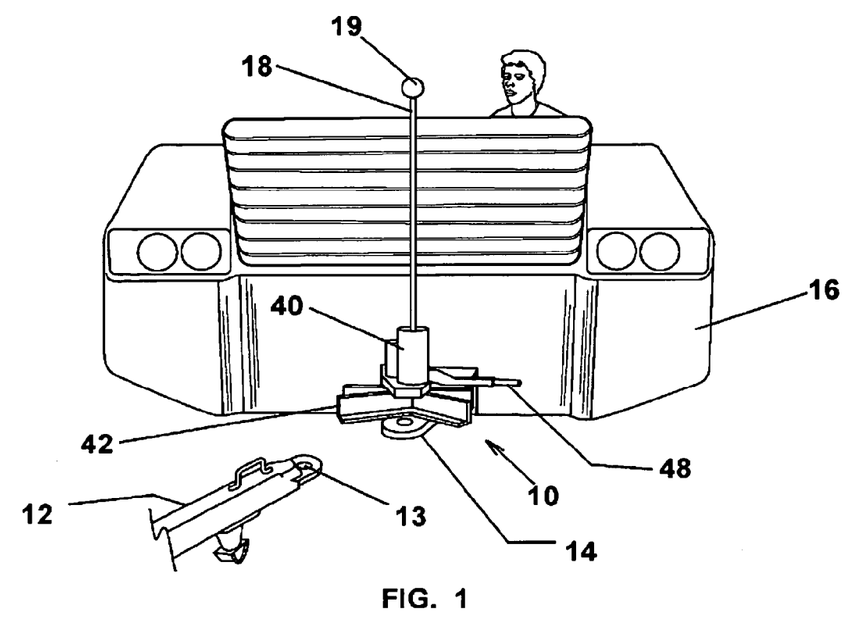
FIG. 1 is a rear perspective view of an aircraft tug provided with the tug hitch assembly in the unlocked position prior to coupling with an aircraft tow bar.
Figure 2:
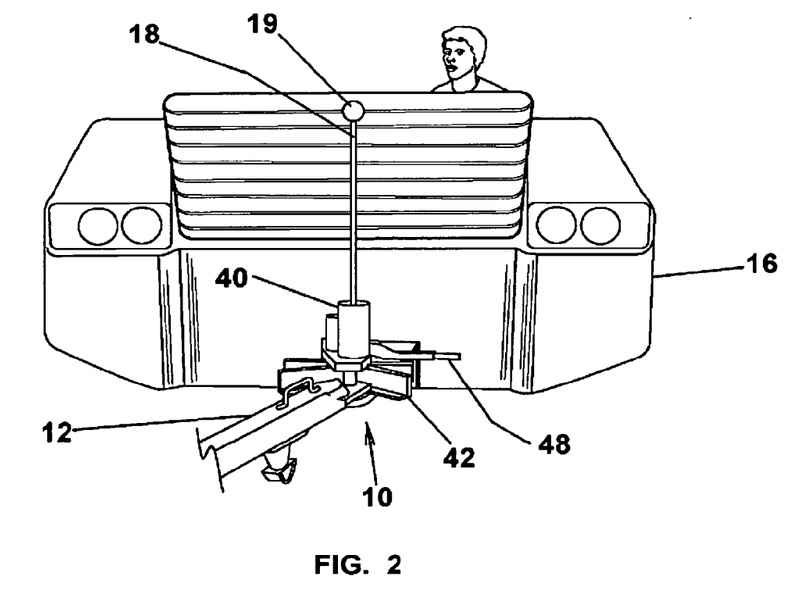
FIG. 2 is a rear perspective view of the aircraft tug with the tug hitch assembly coupled in the locked position with the aircraft tow bar.

Referring to FIGS. 1 and 2 for the purpose of describing a preferred embodiment of the present invention and not for limiting same, a self-aligning tug hitch assembly 10 is provided for coupling an aircraft tow bar 12 including a hitch eyelet 13 to the hitch 14 at the rear of an aircraft tractor or tug 16. In FIG. 1, the tug hitch assembly 10 is in the unlocked position with the tow bar 12 proximate thereto. The tug hitch assembly 10 carries a vertical indicating pole 18 having an indicator ball 19 at the top thereof. In the unlocked position, the indicator ball 19 is above the rear end of the tug 16 providing visual indication of the unlocked status. In FIG. 2, the tow bar 12 is coupled to the tug hitch assembly 10 in a locked position and the indicator ball 19 is below the rear of the tug and not visible to the operator thereby indicating the locked status.

Figure 3:
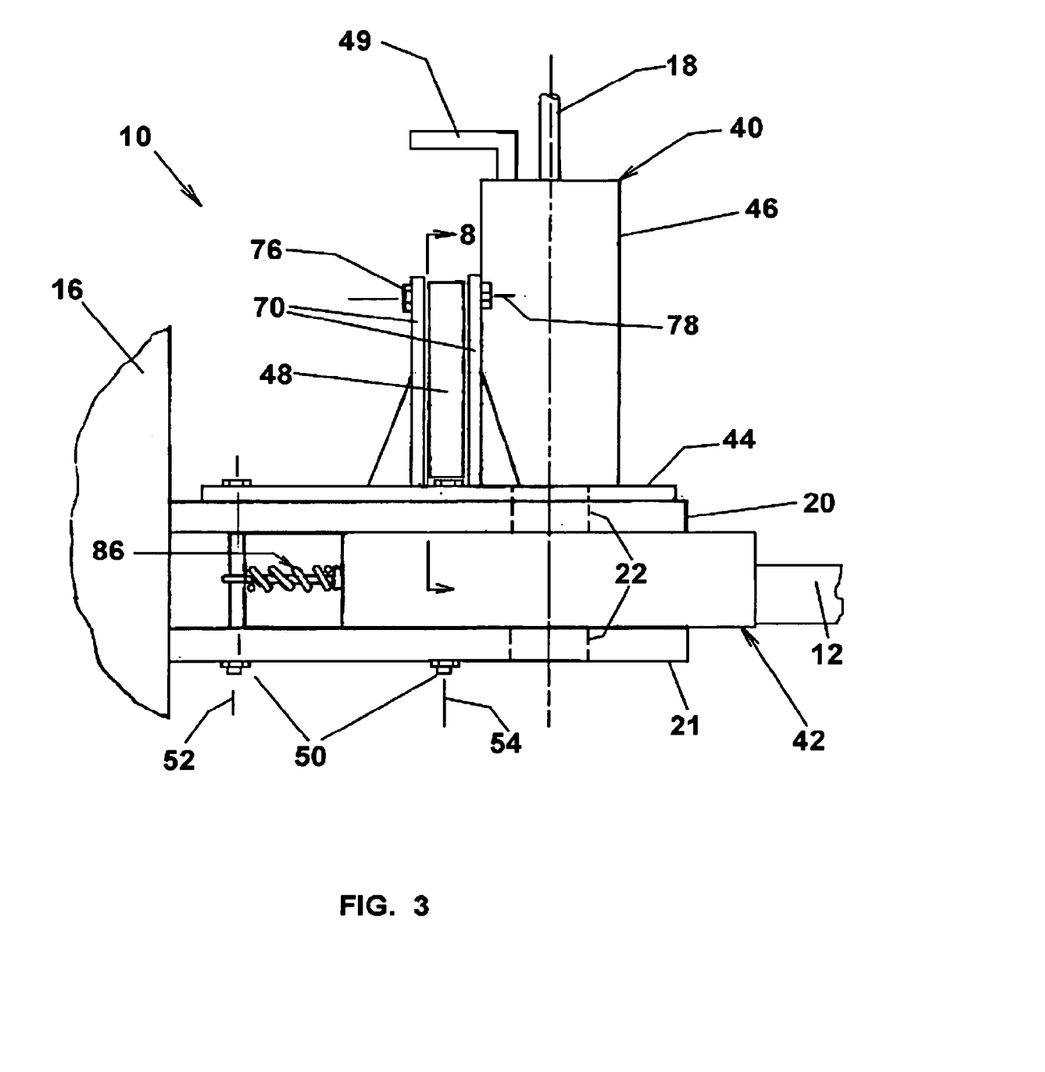
FIG. 3 is a side elevational view of the tug hitch assembly in the locked position with the aircraft tow bar.
Figure 4:
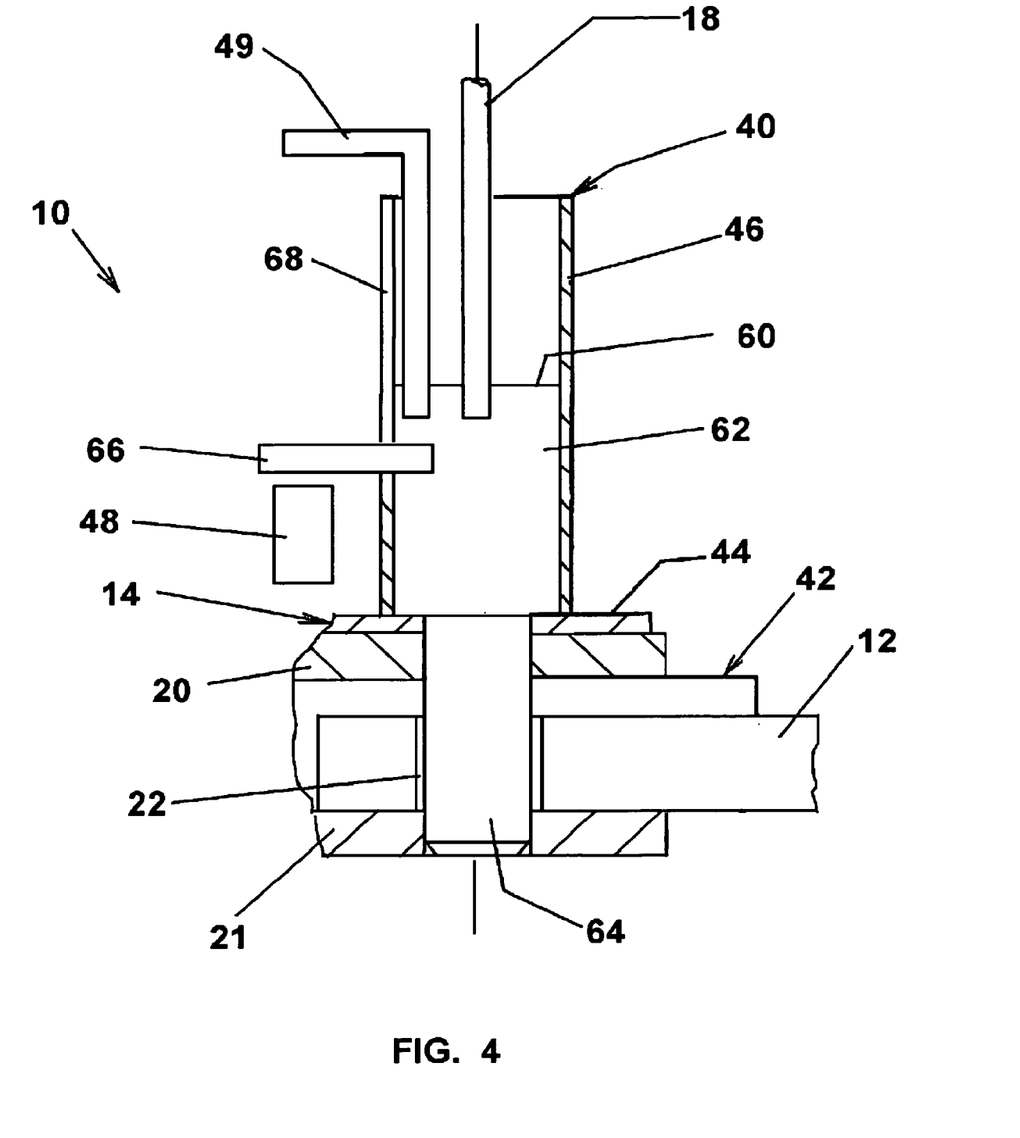
FIG. 4 is a view showing the tow arm aligned at the hitch assembly in the locked position.
Figure 5:
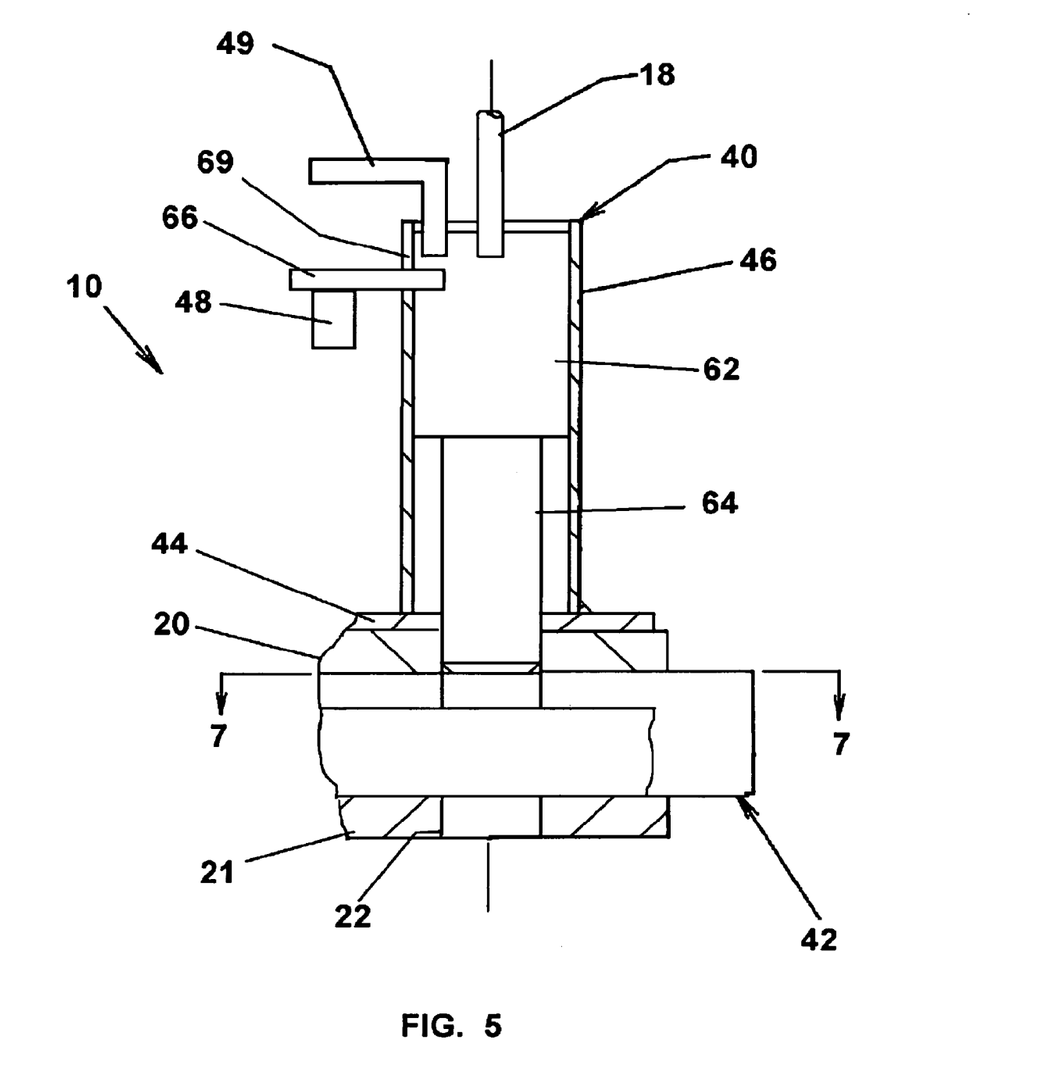
FIG. 5 is another view showing the hitch assembly in locked position with the tow bar.
Figure 6:
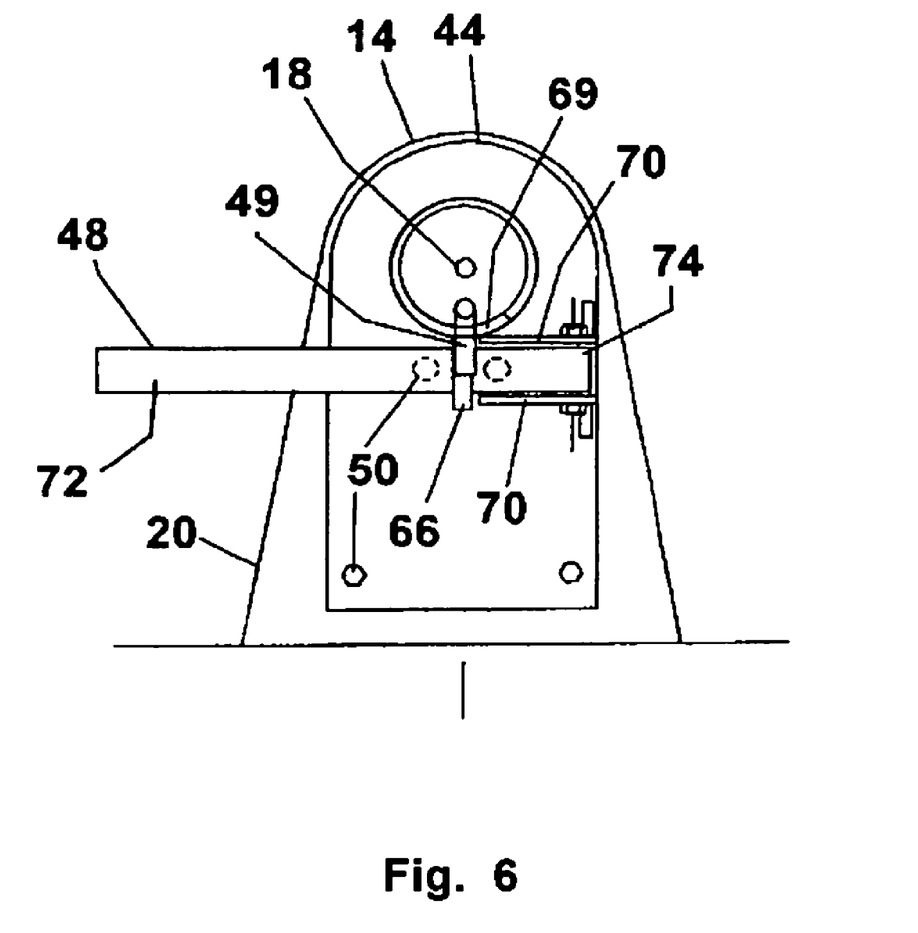
FIG. 6 is a top view of the tug hitch assembly.

Referring additionally to FIG. 3, the hitch 14 is of a type conventionally incorporated on commercial aircraft tugs. The hitch 14 comprises a pair of triangular, vertically spaced upper and lower plates 20, 21 defining therebetween a rearwardly opening horizontal slot for receiving the tow bar eyelet. As shown in FIGS. 4 through 6, the plates 20, 21 are attached at their base ends to the tug 16. The plates 20, 21 have vertical coaxially aligned holes 22 at the forward end. In conventional use, a lock pin is inserted through the holes 22 for coupling the tow bar. The tow bar 12 is a conventional. In a coupling position as shown in FIG. 4, the opening in the eyelet 13 registers with the holes 22 in the plates 20, 21.

The hitch assembly 10 includes a lock assembly 40 and a guide assembly 42. The lock assembly 40 is fixedly connected above the upper plate 20 of the hitch 14. The guide assembly 42 is fixedly connected in the horizontal slot between the upper and lower plates 20, 21 of the hitch 14.

The lock assembly 40 includes a mounting plate 44, a lock cylinder 46, a lifting handle 48 and a release handle 49. The mounting plate 44 and the guide assembly 42 are attached to the top surface of the upper plate 21 by pair of fasteners 50 in two longitudinally spaced transverse rows 52, 54. The layout of the fastener holes conforms with existing hole patterns on many existing tugs.

The lock cylinder 46 is welded at a lower end to the top surface of the mounting plate 44 coaxial with the holes 22 in the hitch plates 20, 21 and a complementary hole in the mounting plate 44.

Referring to FIGS. 4 and 5, a lock pin assembly 60 is slidably carried by the lock cylinder 46. The lock pin assembly 60 includes a cylindrical piston 62 coaxially carrying at the lower end a downwardly depending lock pin 64. A latch rod 66 is transversely connected to the piston 62. As additionally shown in FIG. 8, the latch rod 66 extends outwardly through an upwardly opening vertical guide slot 68 formed in the rearward side of the cylinder 46. A circumferential notch 69 is formed adjacent the slot 68 and provides a stop surface for the latch rod 66 in the unlocked position as described in greater detail below.

As shown in FIGS. 1 and 5, in a raised unlocked position, the piston 62 withdraws the lock pin 64 from the hitch slot. Thereafter the handle 49 is rotated to rotate the piston 62 to locate the latch pin 66 at the notch 69 to establish a detented locked position. In the locked position as shown in FIGS. 2 and 4, the handle 49 and piston 62 are rotated to align the latch rod 66 with the guide slot 68 allowing the piston to fall until the piston 62 engages the mounting plate 44 and the lock pin 64 slides into the openings 22 in the hitch plate 20, 21 thereby coupling the eyelet 30 of the tow bar 12 enabling towing of the aircraft by the tug 16. If desired, a spring assist may be employed for biasing the piston after release.

Figure 8:
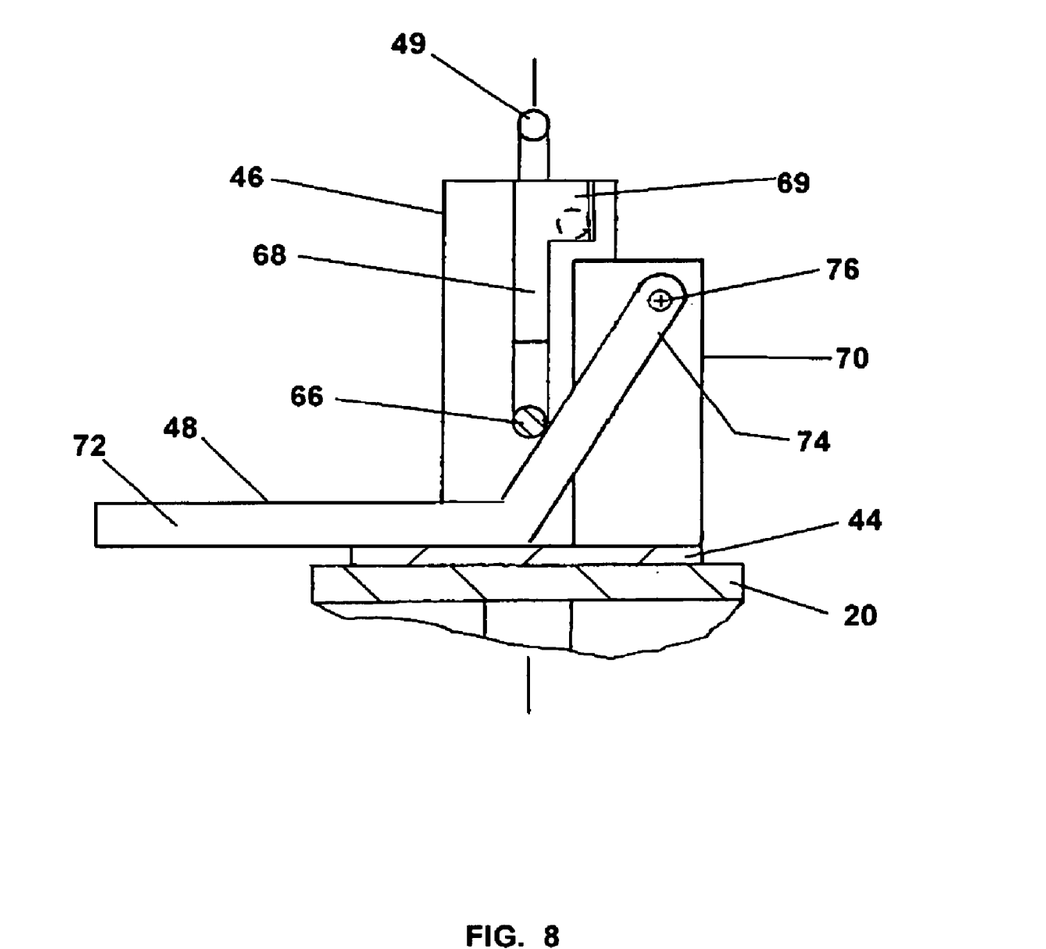
FIG. 8 is a fragmentary view taken along line 8—8 in FIG. 3 showing the lock assembly in the locked position.

Referring to FIGS. 3, 6 and 8, the lift handle 48 extends transversely to the mounting plate 44 rearward of the lock cylinder 46. The inner end of the handle 48 is received between a pair of spaced transverse guide plates 70 attached to the mounting plate 44. The lift handle 48 includes a horizontal leg 72 inwardly terminating with an upwardly inclined arm 74. The outer end of the arm 74 is connected at the upper and outer ends of the guide plates 70 by fastener 76 for pivotal movement about a longitudinal horizontal axis 78. In the locked position the latch rod 66 is slightly above the arm 74 of the lift handle 48. As an operator raises the leg 72 upwardly, the arm 74 engages the latch rod 66, shifting the later and the latch pin assembly 60 upwardly in the guide slot 68. The indicator pole 18 is carried at the top of the piston 62. In the unlocked position, the ball 19 is above the top of the tug chassis and the ball is clearly visible by the tug operator 48 to denote an unlocked condition. In the locked condition, the ball 19 is below the chassis and not observable by the tug operator. Accordingly, the tug operator by virtue of the ball location can determine the locking status of the tug hitch.

Figure 7:
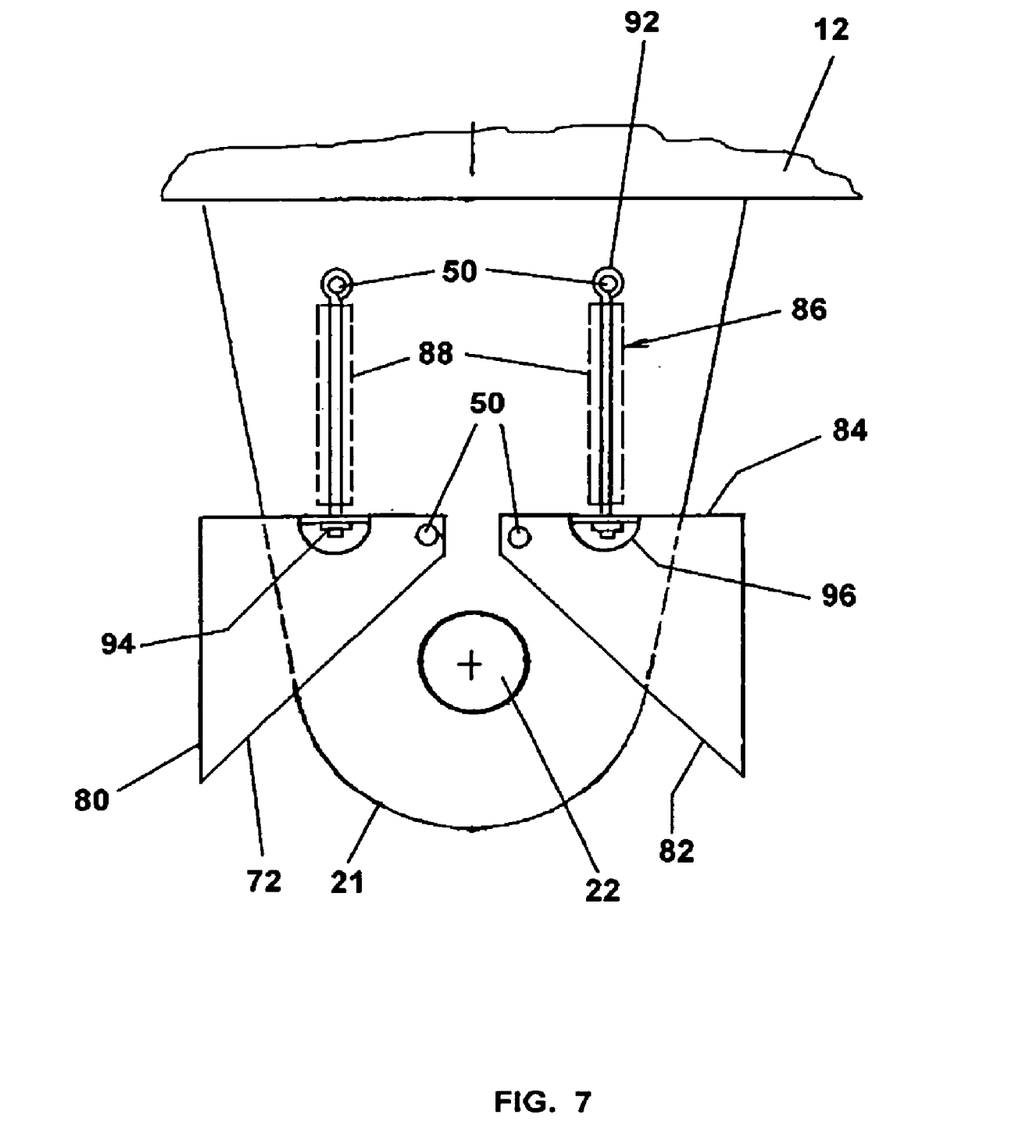
FIG. 7 is a top view of the guide assembly of the tug hitch assembly taken along line 7—7 in FIG. 5.

Referring to FIGS. 3 and 7, the guide assembly 32 comprises a pair of laterally spaced, spring biased locating plate assemblies 80 pivotally attached at inner ends to the hitch 14. The locating plate assemblies 80 are generally wedge shaped having triangular top and bottom plates, forwardly and inwardly converging front plates 82; and transverse rear plates 84. The front plates 82 are normal to the vertical axis of the hitch opening 22 and defining a rearwardly opening triangular pocket of sufficient size for receiving and aligning the tow bar eyelet 13 with the locking pin 64 as the tug operator advances toward the tow bar. Preferably, the front plates 82 have an included angle of around 60° to 120°. Spring assemblies 86 bias the plate assemblies 80 to the illustrated normal position for receiving the tow bar eyelet. Each spring assembly 86 includes a compression spring 88 surrounding a threaded rod 90 having a hook end 92 captured by the shank of a fastener 50. The front end of the rod 90 that extends through an aperture in the rear plate 84 and has a nut and washer assembly 94 adjustably connected thereto for establishing the inclination of the front plates 82 and preloading of the spring 88. Access to the assemblies 94 is provided through apertures 86 in the top plate. As is apparent, in addition to guiding the tow bar into alignment for coupling, the plate assemblies 80 will absorb impacts during alignment. Further, each plate assembly 80 may pivot about the associated fastener 50 sufficiently to accommodate a tow bar orientation transverse to the tug 16, thereby allowing tight radius turns in the towing of the aircraft.

In operation, a ground assistant aligns the tow bar 12 with the pocket of the guide assembly 42 as shown in FIG. 1. The tug operator has see the ball 19 to verify the unlocked condition. When the eyelet 13 is accurately aligned, the assistant rotates the release handle 49 to align with the slot 68 and the piston 62 and lock pin 64 to drop to the locked position shown in FIG. 4, thereby coupling the tow bar, whereat the ball 19 is no longer visible by the tug operator thus confirming the connection.

Unlatching is effected by raising the lifting lever 48, as shown in FIG. 5, to raise the lock pin to the unlocked raised position. Thereafter, the release handle 49 is rotated to locate the latch rod 66 in the notch to establish the unlocked condition.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. An aircraft tug hitch assembly for coupling an aircraft tug to an aircraft tow bar having a hitching aperture at one end wherein said tug has a hitch at the rear thereof including upper and lower plates vertically spaced at a rearwardly opening horizontal slot for receiving said one end of the tow bar said upper and lower plates having coaxially aligned openings, said aircraft tug hitch assembly comprising: a locking assembly having a mounting plate fixedly connected to said upper plate and having an opening aligned with said openings in said upper and lower plates; a cylinder having a bore coaxially with said openings in said plates; a cylindrical piston slidable in said bore; a cylindrical locking pin slidably coaxially attached on a lower end of said piston in coaxial alignment with said opening in said plates and freely slidable between a lowered position extending through the openings in the plates and a raised position spaced above said horizontal slot; a vertical slot is formed in said cylinder; a transverse pin member attached to said piston and extending outwardly through said vertical slot; a notch in the upper portion of said cylinder adjacent said vertical slot; and means for rotating said piston and positioning said pin member at said notch to establish said locked position; a transversely extending handle pivotally connected to said locking assembly, said handle engaging said pin member at middle portion thereof for moving said pin from said lowered position to said raised position; a pair of laterally spaced inwardly converging guide members carried said horizontal slot on said hitch, said guide members defining a receiving pocket aligning said one end of said tow bar with the openings in the plates and permitting movement of said locking bolt from said raised position to said lowered position to couple the tow bar to the tug, said guide members; means for pivotally supporting said guide members at inner ends to said locking assembly; spring means engaging and biasing said guide members to a normal position establishing said pocket, said spring means enabling resilient deflection of said guide members from said normal position upon impact by said tow bar sufficiently to permit said tow bar to orient transverse to the tug and accommodate tight radius turns.

2. The hitch assembly as recited in claim 1 including an upwardly extending rod member attached to said piston and carrying an indicating member at the upper end thereof, said rod member configured such that said indicator member is observable by an operator of the tug when said locking assembly is in the raised position and not observable by the operator when the locking assembly in the lowered position whereby the operator can determine the locking status of the hitch assembly without assistance from other personnel.

3. A hitch assembly for coupling an aircraft tug to a tow bar, said tug having a hitch at the rear including upper and lower plates vertically spaced at a rearwardly opening slot for receiving the eyelet of the tow bar wherein said plates have coaxially aligned openings and said eyelet of the tow bar has an aperture, said hitch assembly comprising: a locking assembly fixedly connected to said upper plate, said locking assembly including a cylinder having a bore coaxially with the openings in the plate, and a lock member coaxially attached to a piston slidable in said bore; a lock member slidably supported on said locking assembly in coaxial alignment with said opening in said plates and freely slidable between a lowered locked position extending through the openings in the plates and a raised unlatched position spaced above the slot wherein a vertical slot is formed in said cylinder and said piston has a transverse pin attached thereto and extending outwardly through said vertical slot, said pin engaged by said lifting means for moving said piston and said lock member between said locked position and said unlocked position; lifting means coacting with said lock member for moving said lock member from said locked position and said unlocked position; detent means coacting with said lock member for releasably maintaining lock member in said unlocked position; a pair of laterally spaced inwardly converging guide members carried on said hitch between said plates defining a receiving pocket aligning said eyelet with said openings in the plates and the aperture in the eyelet thereby permitting movement of said lock member from said unlocked position to said locked position to couple the tow bar to the tug.

4. The hitch assembly as recited in claim 3 wherein a vertical slot is formed in said cylinder and said piston has a transverse pin attached thereto and extending outwardly through said vertical slot, said pin engaged by said lifting means for moving said piston and said lock member between said locked position and said unlocked position.

5. The hitch assembly as recited in claim 3 wherein said detent means includes a notch in the upper portion of said cylinder adjacent said vertical slot, and means for rotating said piston and positioning said pin member into said notch to establish said unlocked position.

6. The hitch assembly as recited in claim 5 wherein said lifting means includes a transversely extending handle pivotally connected to said locking assembly, said handle engaging said pin member at a middle portion thereof for moving said pin member toward said locked position.

7. The hitch assembly as recited in claim 3 wherein said guide members are pivotally supported at inner ends to said locking assembly and spring means for biasing said guide members to a normal position establishing said pocket, permitting resiliently deflection from said normal position upon impact by the eyelet of the tow bar sufficient to permit the tow bar to orient transverse to the tug to accommodate tight radius turns.

8. The hitch assembly as recited in claim 7 wherein said spring means include a compression spring for biasing said guide members to said normal position.

9. The hitch assembly as recited in claim 3 including an upwardly extending rod member attached to said lock pin and carrying an indicating member at the upper end thereof, said rod member configured such that said indicator member is observable by an operator of the tug when the locking assembly is in the unlocked condition and not observable by the operator when the locking assembly in the locked position whereby the operator can determine the locking status of the hitch assembly without assistance from other personnel.

10. The hitch assembly as recited in claim 9 wherein said indicator member is spherically shaped.

11. A hitch assembly for coupling an aircraft tug to a tow bar, said tug having a hitch at the rear including upper and lower plates vertically spaced at a rearwardly opening slot for receiving the eyelet of the tow bar wherein said plates have coaxially aligned openings and said eyelet of the tow bar has an aperture, said hitch assembly comprising: a locking assembly fixedly connected to said upper plate, said locking assembly includes a cylinder having a bore coaxial with the openings in the plate; a lock member slidably supported in said bore for movement between a lowered locked position extending through the openings in the plates and a raised unlatched position spaced above the slot; lifting means coacting with said lock member for moving said lock member from said locked position and said unlocked position; detent means coacting with said lock member for releasably maintaining lock member in said unlocked position thereby permitting movement of said lock member from said unlocked position to said locked position; a pair of laterally spaced inwardly converging guide members pivotally carried on said hitch between said plates for rotation about vertical axes, said plates having a normal position providing a receiving pocket aligning said eyelet with said openings in the plates and the aperture in the eyelet; and spring means for biasing said guide members to said normal position and for permitting resiliently deflection from said normal position upon impact by the eyelet of the tow bar sufficient to permit the tow bar to orient transverse to the tug to accommodate tight radius turns.

\* \* \* \* \*